US010960578B2

(12) United States Patent
Albonetti et al.

(10) Patent No.: US 10,960,578 B2
(45) Date of Patent: *Mar. 30, 2021

(54) METHOD FOR APPLYING AN EXTRUDED SEAL TO A SURFACE

(71) Applicant: SACMI COOPERATIVA MECCANICI IMOLA SOCIETA' COOPERATIVA, Imola (IT)

(72) Inventors: Danilo Albonetti, Imola (IT); Andrea Sallioni, Molinella (IT)

(73) Assignee: SACMI Cooperativa Meccanici Imola Societa' Cooperativa ( * ) Notice: Subject to any disclaimer, the term of this patent is extended or adjusted under 35 U.S.C. 154(b) by 0 days.

This patent is subject to a terminal disclaimer.

(21) Appl. No.: 16/708,620

(22) Filed: Dec. 10, 2019

(65) Prior Publication Data
US 2020/0223103 A1  Jul. 16, 2020

Related U.S. Application Data

(62) Division of application No. 15/105,356, filed as application No. PCT/IB2014/066903 on Dec. 15, 2014, now Pat. No. 10,562,208.

(30) Foreign Application Priority Data

Dec. 18, 2013  (IT) .............................. MO2013A0351

(51) Int. Cl.
*B29C 31/04* (2006.01)
*B29C 48/00* (2019.01)
(Continued)

(52) U.S. Cl.
CPC .......... *B29C 31/048* (2013.01); *B29C 31/041* (2013.01); *B29C 43/18* (2013.01);
(Continued)

(58) Field of Classification Search
CPC ..... B29C 31/048; B29C 47/70; B29C 47/004; B29C 65/48; B29C 43/18; B29C 47/084;
(Continued)

(56) References Cited

U.S. PATENT DOCUMENTS 4,274,822 A  6/1981 Tamai et al.
4,943,405 A  7/1990 Keller et al.
(Continued)

FOREIGN PATENT DOCUMENTS

CN  1035077 A  8/1989
CN  102712113 A  10/2012
(Continued)

OTHER PUBLICATIONS

Smith, J. Scott, et al, Package Closures, Food Processing: Principles and Applications, Feb. 28, 2008, p. 123, John Wiley & Sons.

*Primary Examiner* — Robert J Grun
(74) *Attorney, Agent, or Firm* — Laubscher & Laubscher, P.C.

(57) ABSTRACT

A method for applying a sealant to the surface of an object includes forming an annular dose of synthetic plasticised material supplied from an extruder, depositing the dose on the surface of object and compression forming the dose to form a seal. The extruder includes an annular outlet which is opened and closed to deposit successive doses. Each dose that exits the annular outlet is separated from a supply of plasticized material in the extruder.

8 Claims, 14 Drawing Sheets

(51) Int. Cl.
  *B29C 48/30* (2019.01)
  *B29C 48/32* (2019.01)
  *B29C 43/34* (2006.01)
  *B29C 43/18* (2006.01)
  *B29C 48/09* (2019.01)
  *B29C 48/695* (2019.01)
  *B29C 48/025* (2019.01)
  *B29C 65/48* (2006.01)
  *B29C 43/08* (2006.01)
  *B29C 48/10* (2019.01)
  *B29K 23/00* (2006.01)
  *B29L 31/26* (2006.01)

(52) U.S. Cl.
  CPC .......... *B29C 43/34* (2013.01); *B29C 48/0011* (2019.02); *B29C 48/0255* (2019.02); *B29C 48/09* (2019.02); *B29C 48/303* (2019.02); *B29C 48/32* (2019.02); *B29C 48/695* (2019.02); *B29C 65/48* (2013.01); *B29C 43/08* (2013.01); *B29C 48/0022* (2019.02); *B29C 48/10* (2019.02); *B29C 2043/3433* (2013.01); *B29K 2023/06* (2013.01); *B29K 2023/12* (2013.01); *B29L 2031/26* (2013.01)

(58) Field of Classification Search
  CPC . B29C 31/041; B29C 47/126; B29C 47/0023; B29C 43/34; B29C 47/20; B29C 2043/3433; B29C 47/0066; B29C 43/08; B29C 47/0026
  See application file for complete search history.

(56) References Cited

U.S. PATENT DOCUMENTS 9,409,324 B2   8/2016   Haar
2012/0171381 A1   7/2012   Haar

FOREIGN PATENT DOCUMENTS

| DE | 3804464 C1 | 6/1989 |
| EP | 0328096 A | 2/1989 |
| WO | 2009130578 A2 | 10/2009 |
| WO | 2011023399 A1 | 3/2011 |
| WO | 2013017968 A2 | 2/2013 |

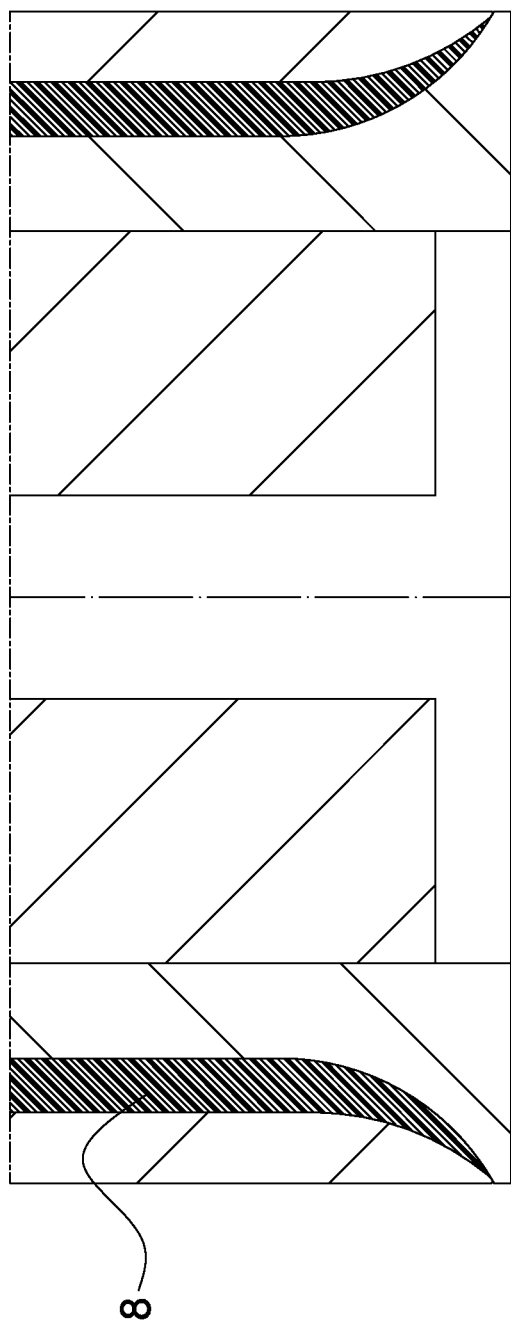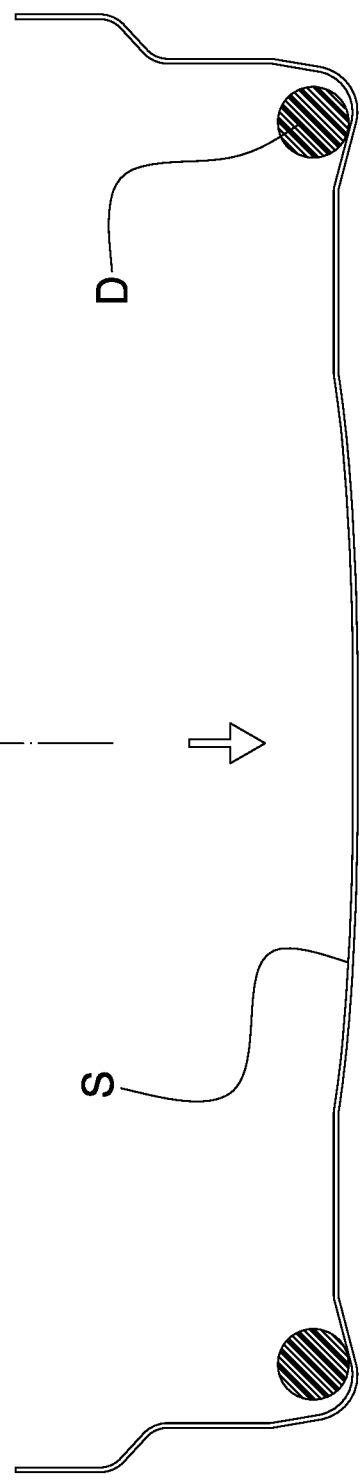
Fig. 11

METHOD FOR APPLYING AN EXTRUDED SEAL TO A SURFACE

This application is a division of application Ser. No. 15/105,356 filed Jun. 16, 2016 which was a § 371 national phase entry of PCT International Application No. PCT/IB2014/066903 filed Dec. 15, 2014. PCT/IB2014/066903 claims priority to IT Application no. MO2013A000351 filed Dec. 18, 2013. The entire contents of these application are incorporated herein by reference.

BACKGROUND OF THE INVENTION

The invention relates to a method and an apparatus for forming annular doses, in particular for forming an annular dose made of plasticised material supplied by an extruder and applying the dose that has just been formed to a surface.

Specifically, but not exclusively, the invention can be used to apply a seal to a surface, for example to form seals inside capsules (made of metal or plastics) to close containers. The invention can be further used to apply an annular dose to a flat element (for example a disc), made in particular of metal or plastics that can then be inserted, as a sealant, into a more complex device. It is possible, in other uses of the invention, to apply the annular dose (acting as a sealant) to a cardboard element intended, for example, to form a container or a portion of a container, or directly to a container, for example made of plastics or metal. The annular dose could also be inserted, according to another use of the invention, directly into a mould to obtain an object therefrom (for example a cap consisting of a wall of plastics and a central metal disc provided with a seal obtained from the annular dose) or also with different functions from the closing function.

The prior art comprises the patent publication US 2012/0171381 A1, which shows an apparatus made in accordance with the preamble to claim one, for forming an annular dose of plasticised material to be deposited on the surface of a cap for containers to give rise to the sealing washer. In such an apparatus the dose is separated and expelled by virtue of the great closing velocity of the mould that makes the material squeeze out.

This known apparatus nevertheless has numerous limits and drawbacks.

Firstly, the material that forms the annular dose is pressed out at high pressure, with a possible localised increase of the temperature and consequent deterioration of the material and/or adhesion of the material to the conduit surfaces.

Secondly, in order to press out the material, low viscosity has to be maintained and it is thus necessary to work at relatively high temperatures.

Further, whilst on the one hand using high-viscosity materials causes very high working pressure, on the other hand using low-viscosity materials causes problems of leakage of the material from the seals.

Another drawback is that the annular dose, by squeezing out at high speed from the mould, can get deformed in a manner that is not easily controllable.

SUMMARY OF THE INVENTION

One object of the invention is to remedy one or more of the aforesaid limits and drawbacks of the prior art.

Another object is to make an apparatus for forming an annular dose of plasticised material to be deposited on a surface.

A further object is to devise a method for forming an annular dose of plasticised material to be deposited on a surface.

One advantage is to separate the annular dose from a continuous flow of plasticised material supplied by an extruder.

One advantage is that the plasticised material can exit an annular extruder outlet, forming the annular dose, at a relatively low pressure.

One advantage is to avoid a localised increase of the temperature of the material in the outlet zone with the consequent deterioration of the material and/or adhesion of the material to the conduit surfaces.

One advantage is to enable effective working even at high viscosity and thus at relatively low temperatures.

One advantage is to enable effective working of both high and low-viscosity materials.

One advantage is to avoid leakage problems of the plasticised material.

One advantage is to form annular doses of the desired form in a manner that is repeatable with precision.

One advantage is to provide an apparatus that is constructionally simple and cheap.

Such objects and advantages and still others, are achieved by the apparatus and/or by the method according to one or more of the claims set out below.

In one example, an apparatus for forming annular doses comprises a tubular wall that has a longitudinal axis and is axially movable for closing an annular outlet from which the plasticised material exits with a component that is normal to the longitudinal axis, the tubular wall having a cutting edge that shears the plasticised material during the closing movement in such a manner to separate the annular dose, which is formed outside the outlet, from the material that remains inside the outlet.

BRIEF DESCRIPTION OF THE DRAWINGS

The invention can be better understood and implemented with reference to the attached drawings that illustrate some embodiments by way of non-limiting example.

FIG. 11 is an enlarged detail of FIG. 8.

DETAILED DESCRIPTION

In this description, similar elements that are common to the various embodiments illustrated have been indicated by the same numbering.

A machine 1 as a whole has been indicated for forming annular doses D and for applying the annular doses to a surface S. The machine 1 includes a plurality of forming apparatuses 2 for forming annular doses arranged angularly spaced apart from one another on a rotating carousel 3. The carousel 3 may rotate, for example, around a vertical rotation axis. The machine 1 further includes an extruder 4 for supplying synthetic plasticised material to the rotating carousel 3. The extruder 4 includes an extruding screw (with rotation speed of the screw, in a closed or open loop, controlled by the programmable electronic control device). The extruder 4 includes a stabilising device (for example a volumetric pump) downstream of the extruding screw which stabilizes the oscillations of the flowrate of the synthetic plasticised material to provide an almost constant flowrate of the material. The machine 1 is in particular usable for forming seals inside capsules for closing containers.

Figure 1:
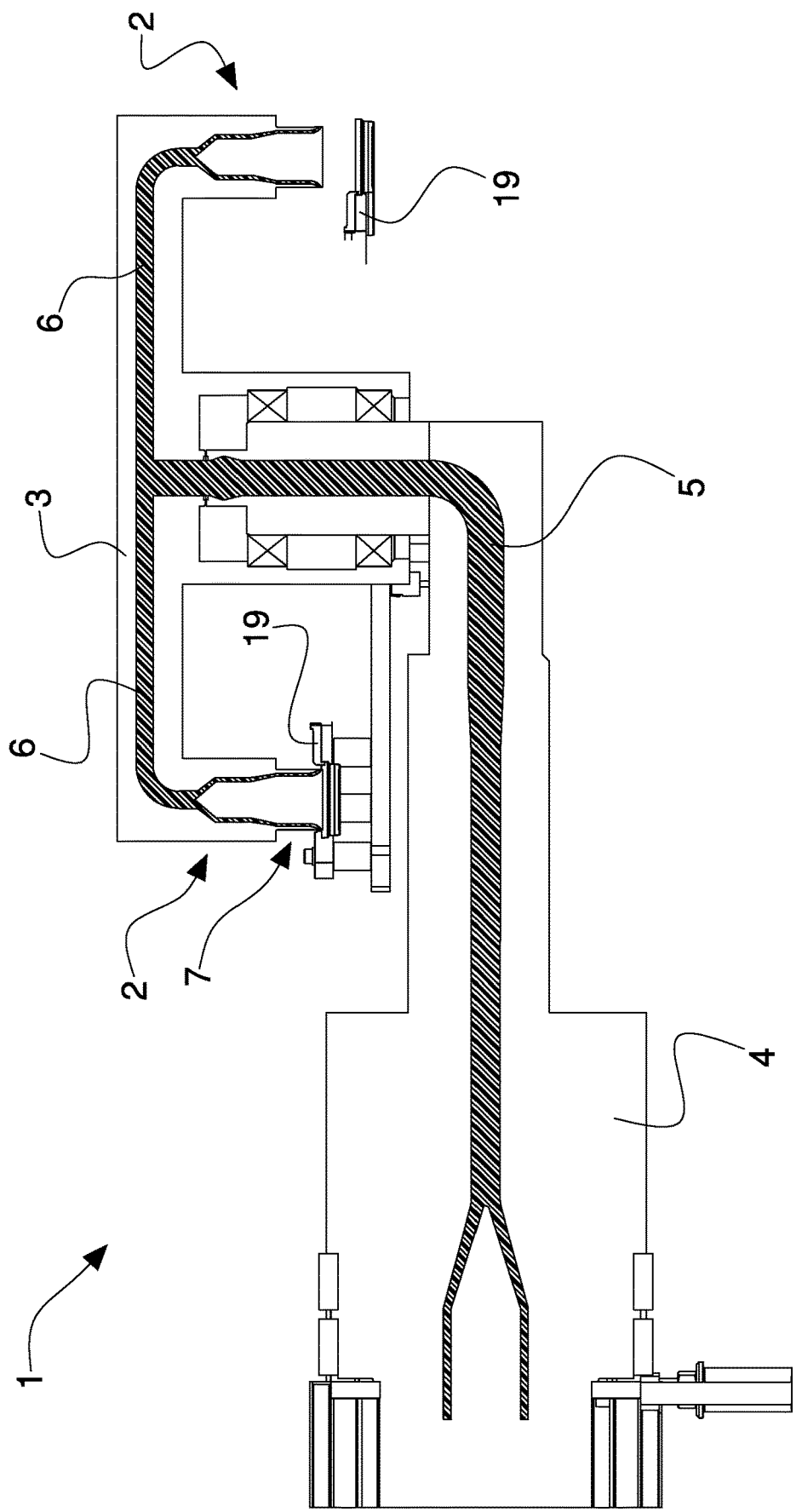
FIG. 1 is a schematic section, in a vertical elevation, of an example of a machine, of rotating carousel type, for forming annular doses in plasticised material, according to the present invention.

In FIG. 1 the supply path of the plasticised material from the extruder 4 is visible. This path comprises a first path part (fixed part outside the carousel) in which the material is supplied in a plasticised form up to the carousel 3 by means of a main conduit 5. In a second path part (rotating part inside the carousel) the material is supplied to the different forming apparatuses 2 by means of a plurality of secondary conduits 6 that branch off from the main conduit 5. Each secondary conduit 6 then ends with an annular nozzle 7 from which the annular dose D exits. The fixed part and the rotating part of the path of the plasticised material in the extruder 4 may be connected together by a connecting device (of known type), for example a rotating distributor.

Each single forming apparatus 2, in particular each annular extruding nozzle 7, may comprise at least one annular channel 8 for supplying plasticised material. This annular channel 8 may communicate, for example in a derivation ratio, with a secondary conduit 6.

The annular channel 8 may have at least one longitudinal axis X (for example a vertical longitudinal axis X or a longitudinal axis X parallel to the rotation axis of the carousel 3). The annular channel 8 may comprise, as in this example, at least one channel portion of a substantially cylindrical tubular shape.

Each forming apparatus 2, in particular each annular extruding nozzle 7, may comprise an annular outlet 9 arranged at the end of the annular channel 8. The annular outlet 9 may be shaped in such a manner that the exit direction of the annular portion of extruded plasticised material has at least one radial component that is normal to the aforesaid longitudinal axis X.

Each forming apparatus 2, in particular each annular extruding nozzle 7, may comprise at least one core 10 (central or internal) that internally bounds the annular channel 8 and/or may comprise at least one tubular wall 11 (peripheral or external) that externally bounds the annular channel 8.

Figure 2:
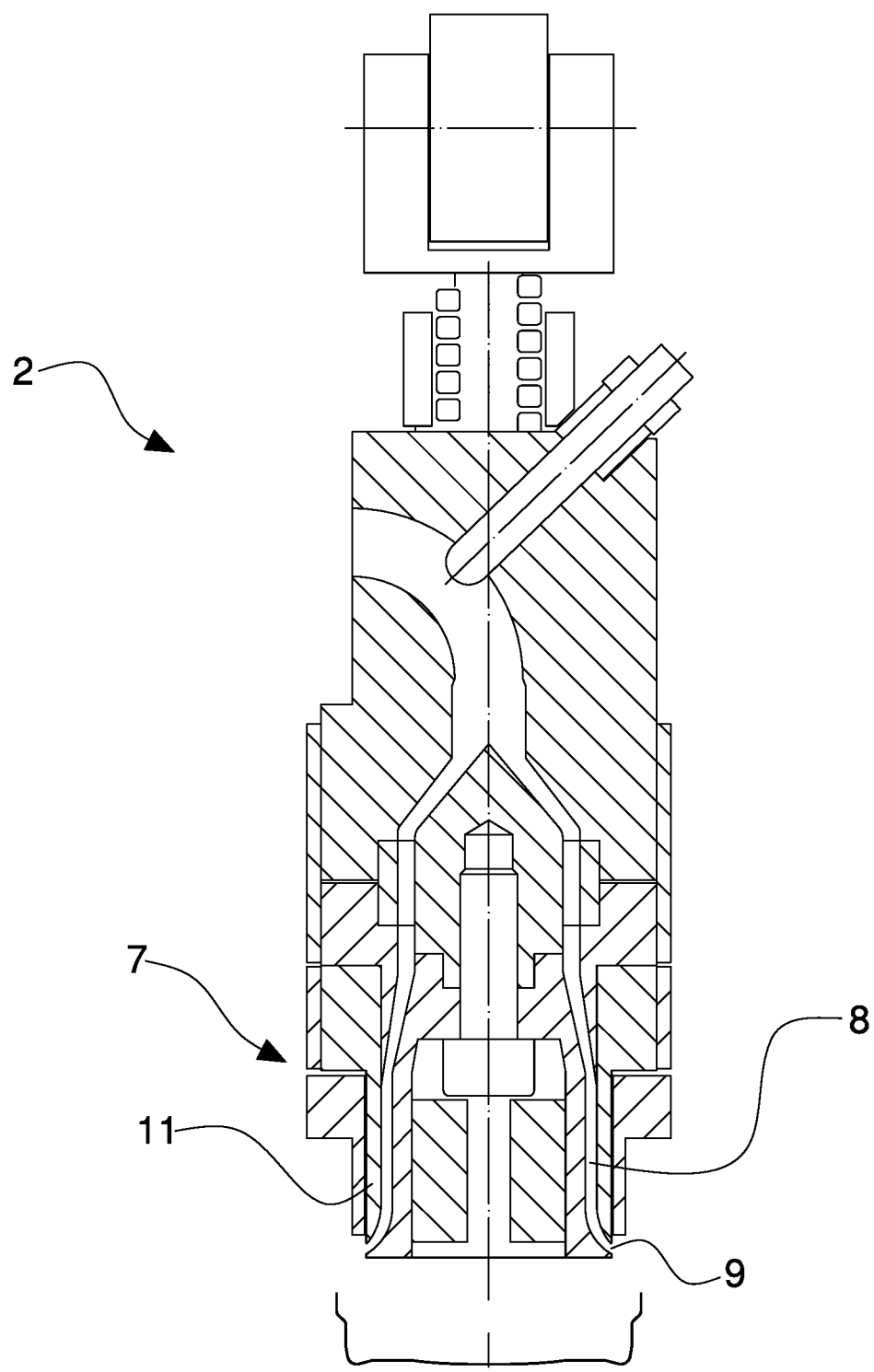
FIG. 2 is a section, in a vertical elevation, of a detail of FIG. 1 in which a forming apparatus is shown, according to the invention, in an open operating configuration of the annular extruding nozzle.
Figure 3:
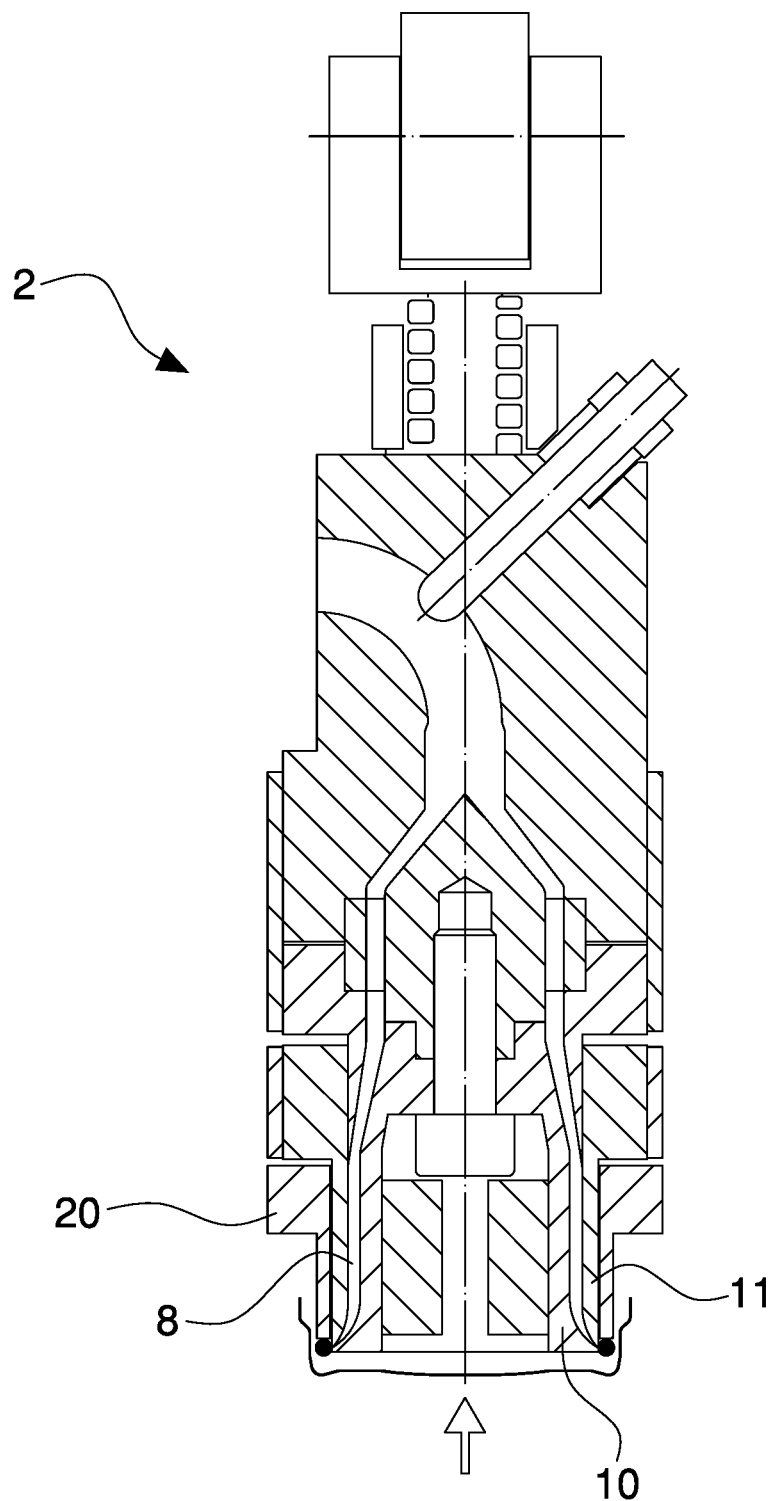
FIG. 3 is the section in FIG. 2 with the apparatus in a closed operating configuration of the annular extruding nozzle.
Figure 4:
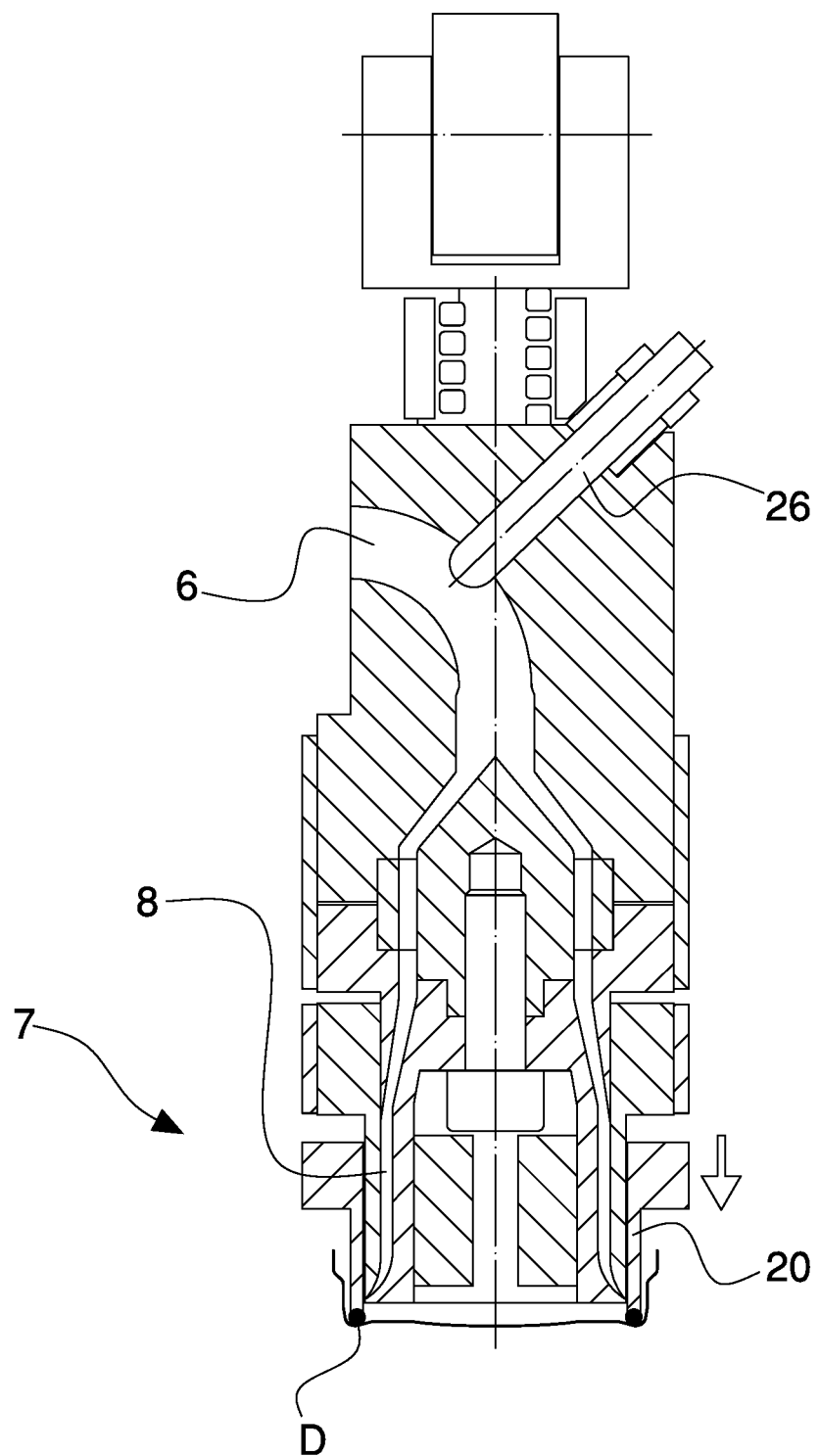
FIG. 4 is the section in FIG. 3 with the apparatus in an operating configuration depositing the annular dose on a surface.
Figure 5:
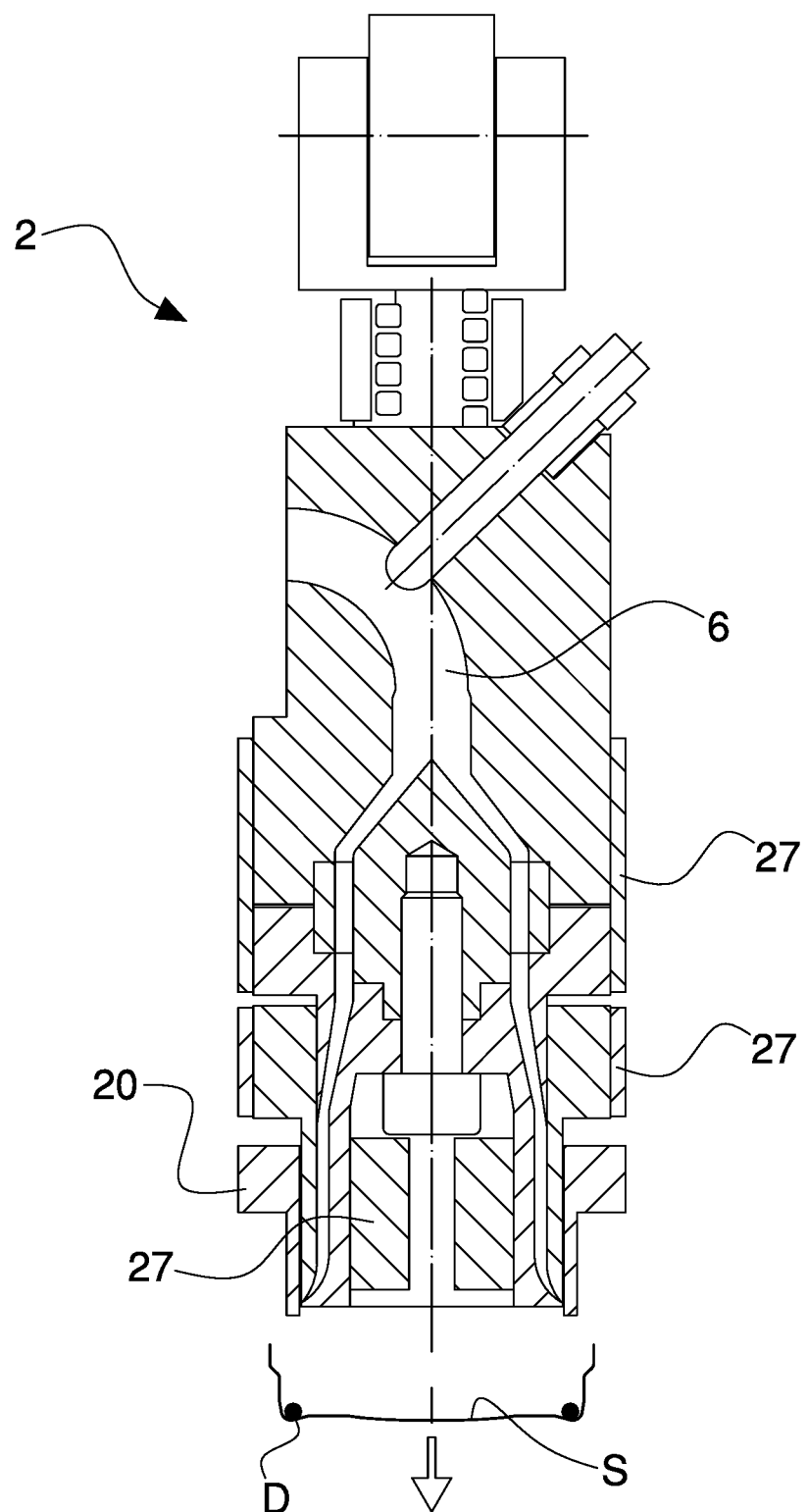
FIG. 5 is a section of FIG. 4 with the apparatus in an operating configuration removing the surface from the extruding nozzle.
Figure 6:
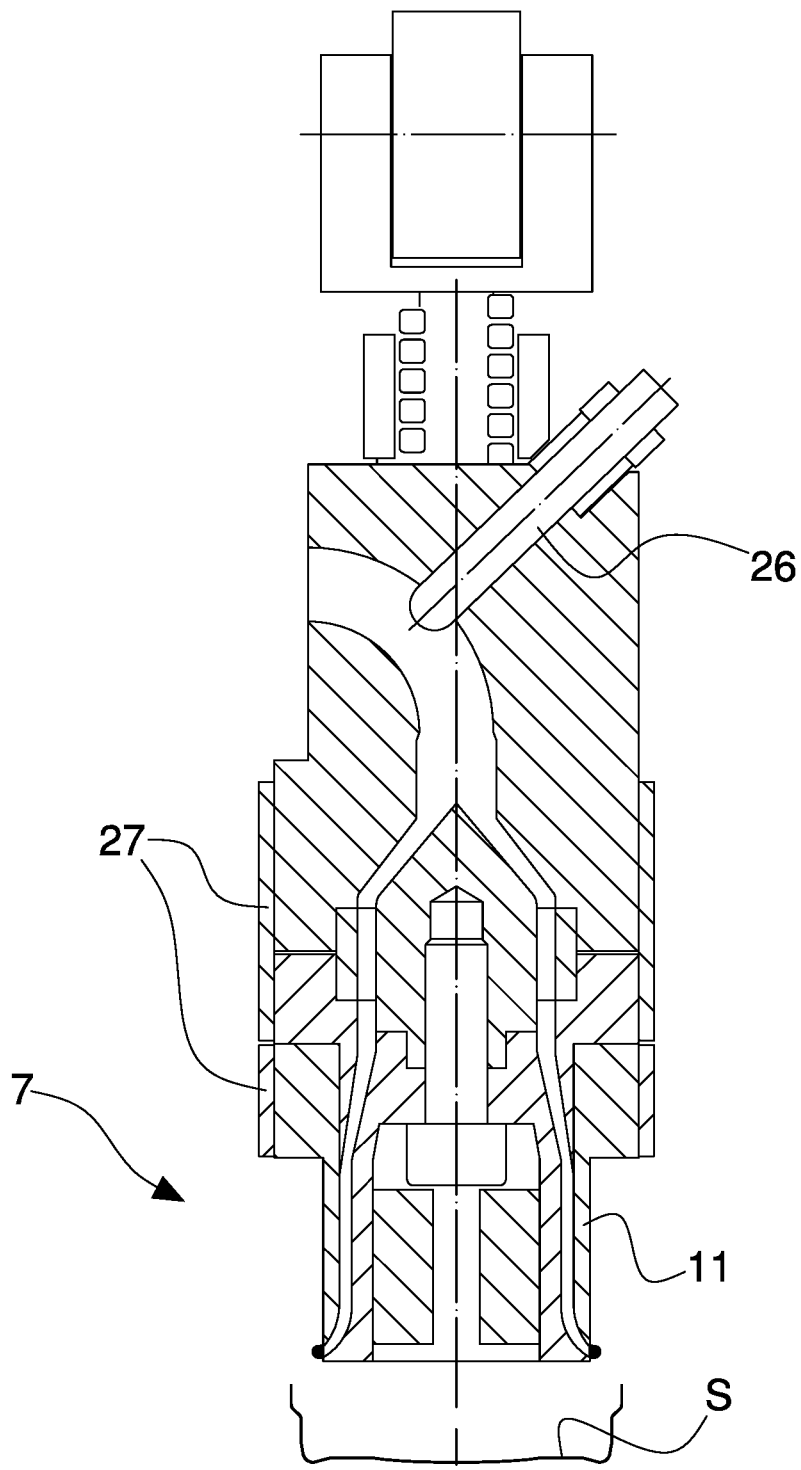
FIG. 6 is a section, in a vertical elevation, of a second embodiment of a forming apparatus according to the invention, in an open operating configuration of the annular extruding nozzle.
Figure 7:
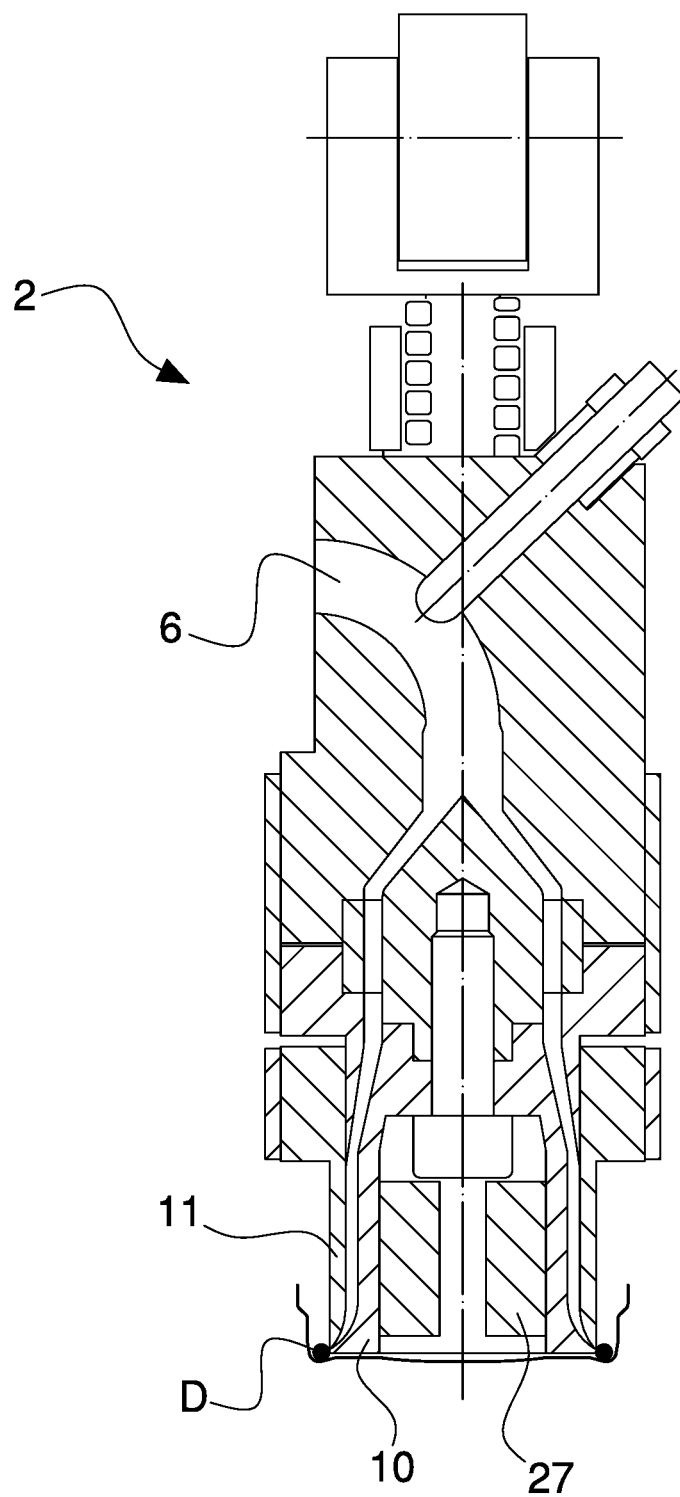
FIG. 7 is the section in FIG. 6 with the apparatus in a closed operating configuration of the annular extruding nozzle and a simultaneously deposit operating configuration of the annular dose on a surface.
Figure 8:
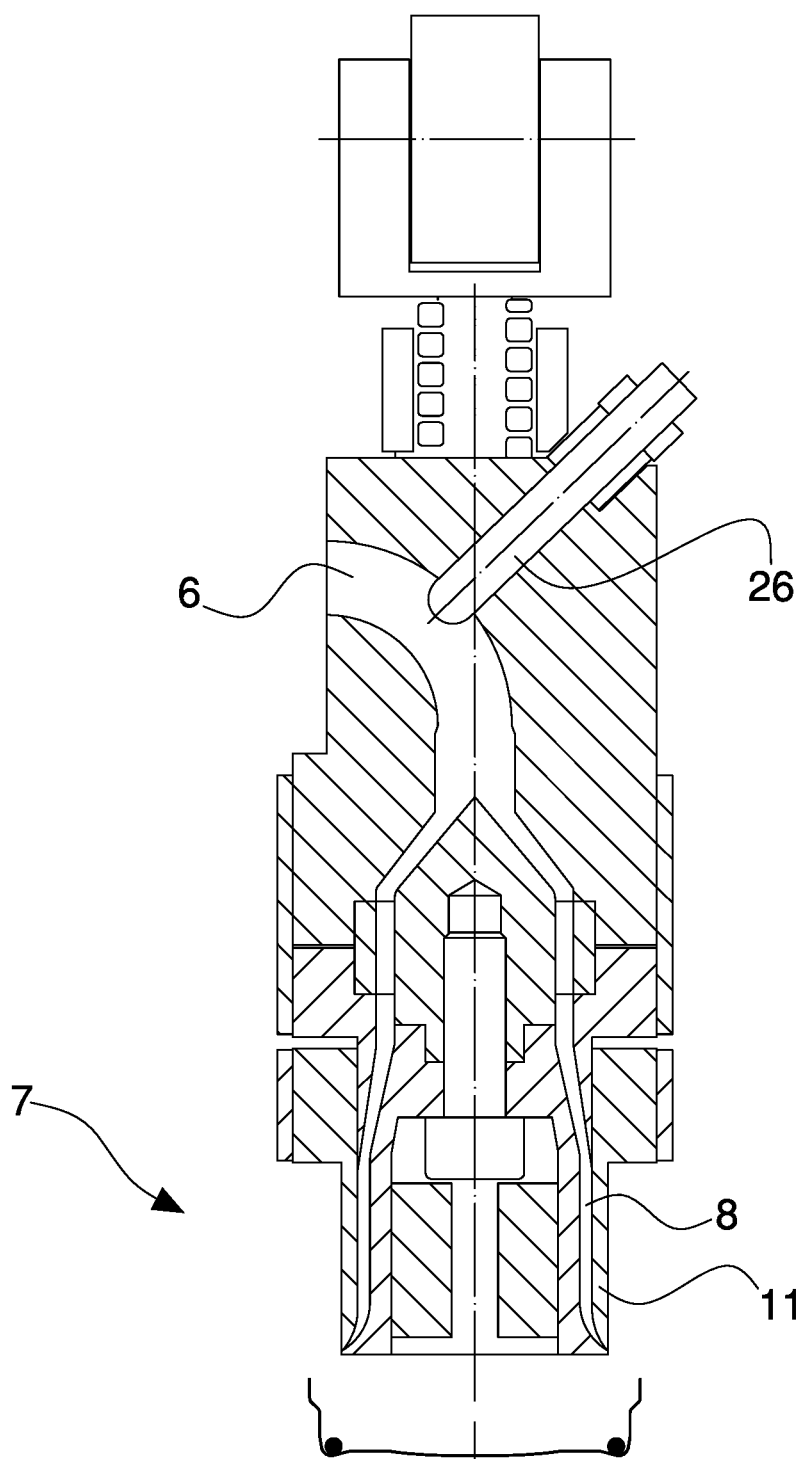
FIG. 8 is the section in FIG. 7 with the apparatus in an operating configuration removing the surface from the extruding nozzle.
Figure 9:
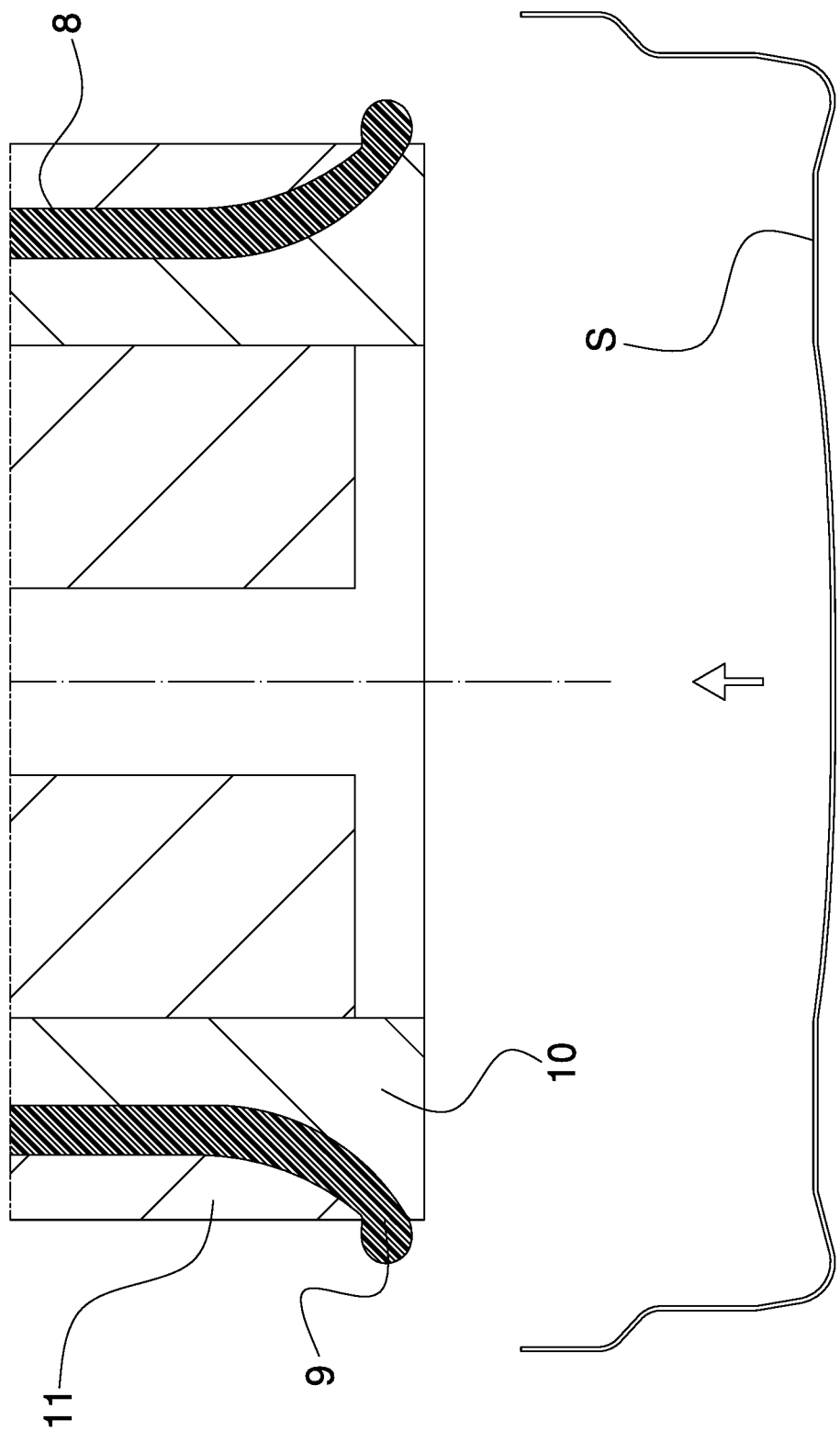
FIG. 9 is an enlarged detail of FIG. 6.

The tubular wall 11 and the core 10 may be moved reciprocally (in a direction that is vertical and/or parallel to the rotation axis of the carousel and/or parallel to the longitudinal axis X of the annular channel 8) with the possibility of adopting at least one open position (FIGS. 2, 6, 9) and a closed position (3, 7, 10) of the annular outlet 9. In particular, the tubular wall 11 may be movable (axially, in a direction parallel to the longitudinal axis X thereof) with respect to the rotating frame of the carousel 3.

In a closed position, the tubular wall 11 may have, as in this example, at least one annular obturator surface 12 that interacts in contact with an annular obturator seat 13 arranged on the core 10 to close the annular outlet 9. The closure (in contact) of the obturator surface 12 against the annular obturator seat 13 causes the material exiting the annular outlet to be separated from the material remaining inside, thus forming an annular dose D with the material outside the outlet.

Figure 13:
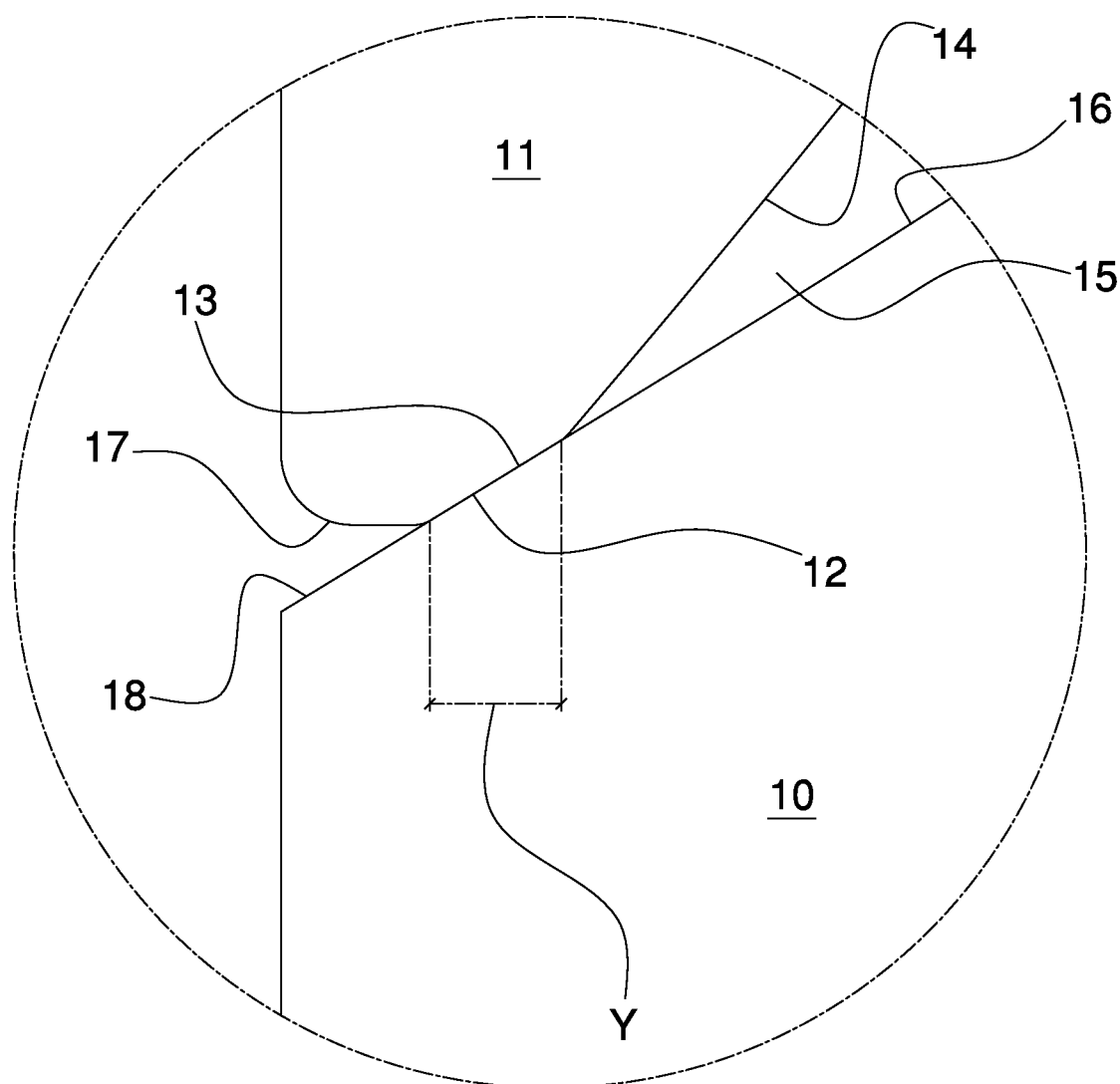
FIG. 13 shows an enlarged detail of FIG. 12.

In the open position, the annular outlet 9 may have one (upper) side bounded by the obturator surface 12 and an opposite (lower) side bounded by the annular obturator seat 13. In the enlargement of FIG. 13, the (upper) obturator surface 12 and the annular obturator seat 13 are shown in a closed position (in reciprocal contact). The two opposite (upper and lower) sides may have, for example, the same shape (for example circular) and the same dimensions (same diameter) so as to be substantially superimposable on one another in an axial direction.

Each apparatus 2 includes, for example, a driving device for moving the tubular wall 11 and/or core 10 (in the specific case only the tubular wall 11) so as to perform opening and closing cycles of the annular outlet 9 in order to form at each cycle at least one annular dose D. Such driving device includes, for example, a cam (not shown). Such cam includes, in particular, at least one fixed cam profile, for example a profile that extends substantially in an arc that is coaxial with the rotation axis of the carousel 3. This cam includes, in particular, at least one cam follower associated with the closing movable element (tubular wall or core) and coupled with the aforementioned cam profile. The cam follower includes, for example, a rolling roller that is slidable on the cam profile.

The tubular wall 11 may have, as in this example, at least one cutting edge that is arranged for shearing the plasticised material during the closing movement of the annular outlet 9 so as to separate the annular dose D, which is formed outside the outlet, from the plasticised material which remains inside the outlet.

The tubular wall 11 may have, for example, at least one annular internal distal surface 14 that is adjacent to (contiguous with) the obturator surface 12. In the closed position the internal distal surface 14 may be at a non-nil (axial) distance from the core 10 so as to define an annular gap 15 that is interposed axially, in a direction that is parallel to the longitudinal axis X, between the internal distal surface 14 and an internal surface 16 of the core adjacent to (contiguous with) the annular obturator seat 13.

The aforesaid cutting edge may, in particular, separate the annular dose D from the material that remains inside the aforesaid annular gap 15.

The annular cutting edge may be arranged, as in this case, on the obturator surface 12 or in a position (immediately) adjacent thereto.

The annular gap 15 may have an axial width A (where "axial width" means the width component measured in a direction that is parallel to the longitudinal axis X) that increases proceeding towards the interior of the annular nozzle 7. This axial width A may grow, in particular, in a continuous gradual manner.

The annular gap 15 may have a radial width R (whereby "radial width" the width component is meant that is measured in a direction that is normal to the longitudinal axis X) that grows proceeding inside the annular nozzle 7. This radial width R may grow, in particular, in a continuous gradual manner.

The internal distal surface 14 of the tubular wall 11 and the internal surface 16 of the core 10 may be two annular surfaces that are tilted with respect to the longitudinal axis X, in particular with tilts that are different from one another. These two tilted annular surfaces may be, as in the disclosed example, two curved surfaces with curves that are different from one another.

In the reciprocal closing and opening movement of the annular outlet 9, the tubular wall 11 and the core 10 may be axially movable in relation to one another in the direction of the aforesaid longitudinal axis X.

The obturator surface 12, which may be in contact with the obturator seat 13 in a closed position, may have, in particular, a radial obturator width Y (i.e. the width component of the surface 12 measured in a direction that is normal to the longitudinal axis X) that is less than 0.2 mm, or less than 0.1 mm, or less than 0.05 mm, or less than 0.04 mm, or less than 0.03 mm, or less than 0.02 mm, for example a radial obturator width Y that is the same as 0.01 mm±50%.

The obturator surface 12 and the obturator seat 13 may be, as in this specific example, joined surfaces that are both joined in a troncoconical manner. In particular, the obturator surface 12 and the annular obturator seat 13 may be in the form of revolution surfaces that are coaxial with the longitudinal axis X of the annular channel 8.

The tubular wall 11 may have, as in this case, at least one annular external distal surface 17 that is adjacent to (contiguous with) the obturator surface 12 and shaped in such a manner as to define, in a closed position and in collaboration with an annular external surface 18 of the core 10 adjacent to the annular obturator seat 13, an annular groove that is (radially) open to the exterior.

Figure 10:
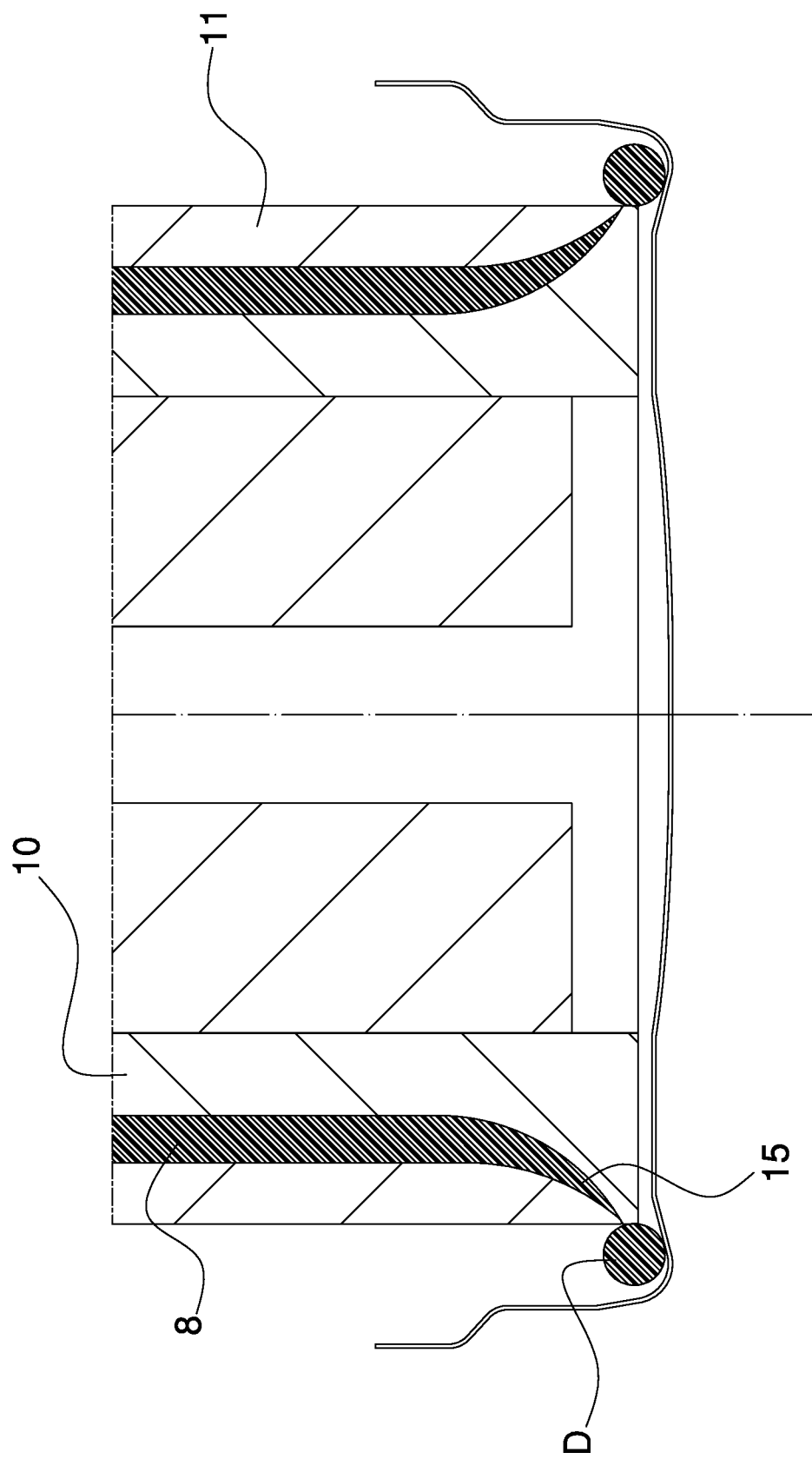
FIG. 10 is an enlarged detail of FIG. 7.
Figure 12:
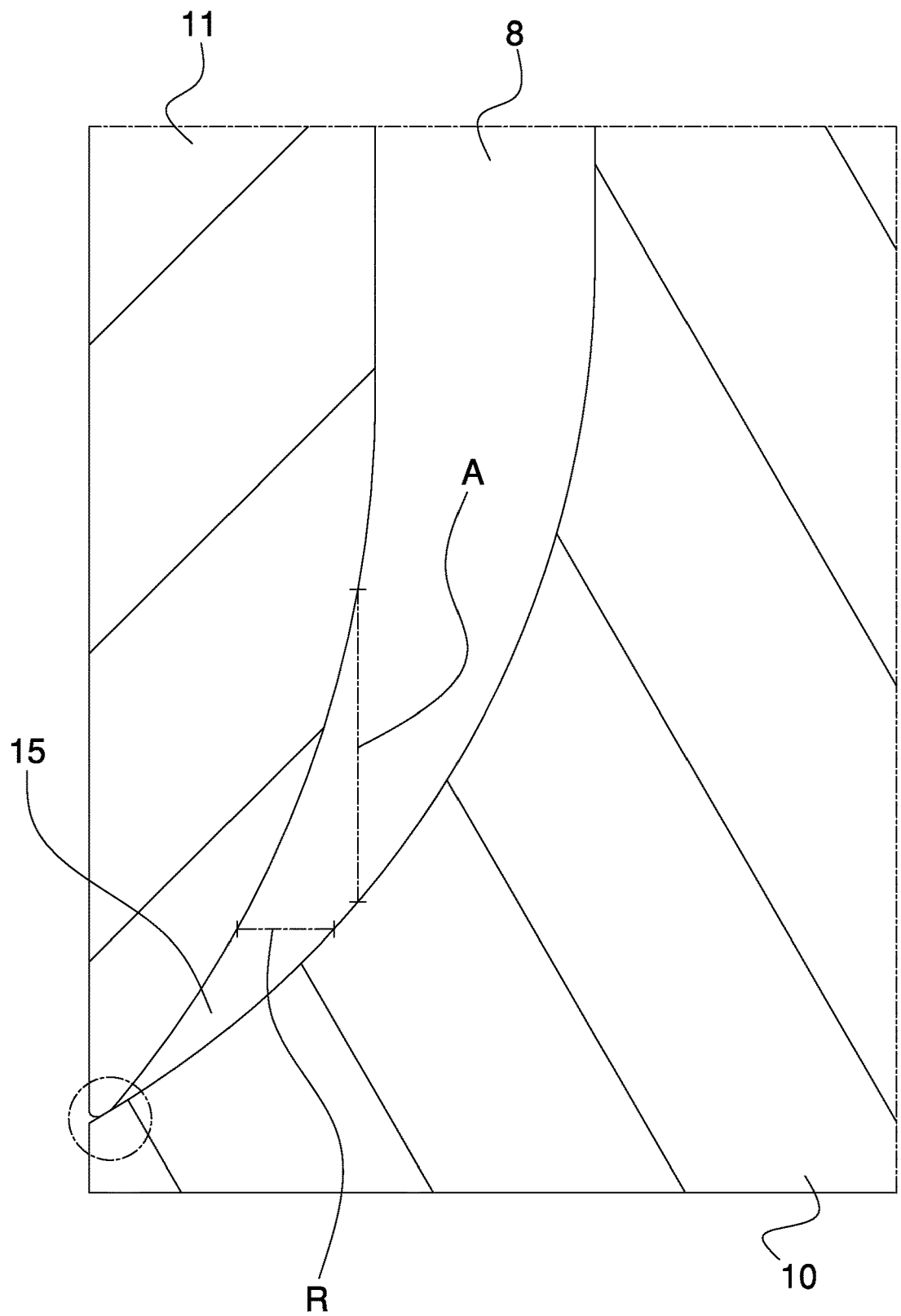
FIG. 12 shows the section of FIG. 10 without the plasticised material for showing the outlet zone better.

It is possible to provide the use of a movable support 19 for supporting an object, in particular a capsule for containers, having the surface S on which to deposit the annular dose D. The support 19 can adopt a receiving position (for example as in FIG. 10) in which it is near the annular outlet 9 so that the annular dose D which has just been formed is in contact with a surface S of the supported object and can adhere to this surface. The support 19 can adopt a detached position (FIG. 11) in which it is far from the annular outlet 9 so that the annular dose D adhered to the surface S of the object is detached from the nozzle. This surface S may be preventively activated by heating and/or by a layer of primer and/or by other adhesion-promoting device to favour this detachment.

The support 19 (for example of known type and for this reason not illustrated in greater detail) may be moved by a driving device that guides the movement towards and away from the annular outlet 9 (of the extruder nozzle 7). This driving device includes, for example, a cam (not shown). Such cam includes, in particular, at least one fixed cam profile, for example a profile that extends substantially in a circumferal arch that is coaxial with the rotation axis of the carousel 3. This cam includes, in particular, at least one cam follower coupled with the aforementioned cam profile and associated with the support 19 that carries the surface upon which the dose is deposited. The cam follower includes, for example, a roller that is slidable on the cam profile.

The apparatus 2 includes (as in the example illustrated in FIGS. 2 to 5) an annular piston pushing device 20 arranged around the annular outlet 9 to push the annular dose D downwardly to a surface S. The vertical movement of the pushing device 20 may be commanded by a driving device (of known type), for example by a cam similar to what is disclosed above, or by a fluid actuator.

The apparatus 2 includes a blower having an annular opening for blowing a jet that is arranged around the annular outlet 9 to push the annular dose D to a surface S. This blower includes an annular conduit integrated into the annular piston pushing device 20. It is possible, in other examples that are not shown, to provide a blower without the piston pushing device or, vice versa, the piston pushing device without the blower.

The apparatus 2 includes, or may be operationally associated with a compression-forming device for forming the annular dose D after the annular dose D has been separated and deposited on the surface S. This compression-forming device may be arranged, in particular, on a further carousel (not shown) downstream of the apparatus 2 that forms and applies the annular doses D.

Figure 15:
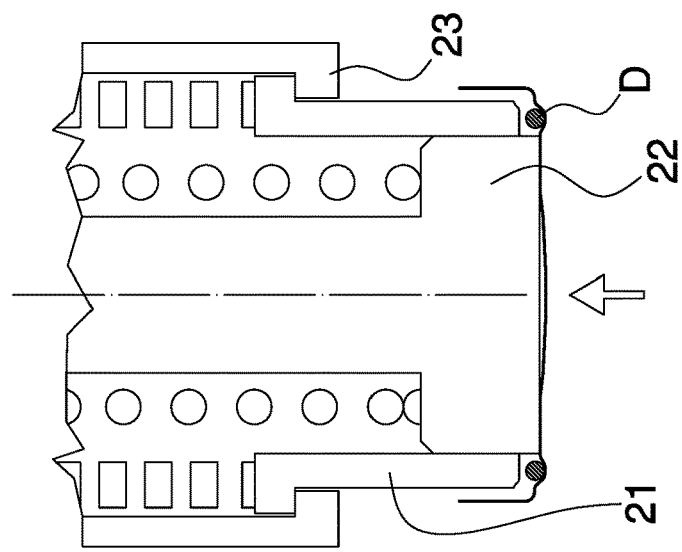
Figure 14:
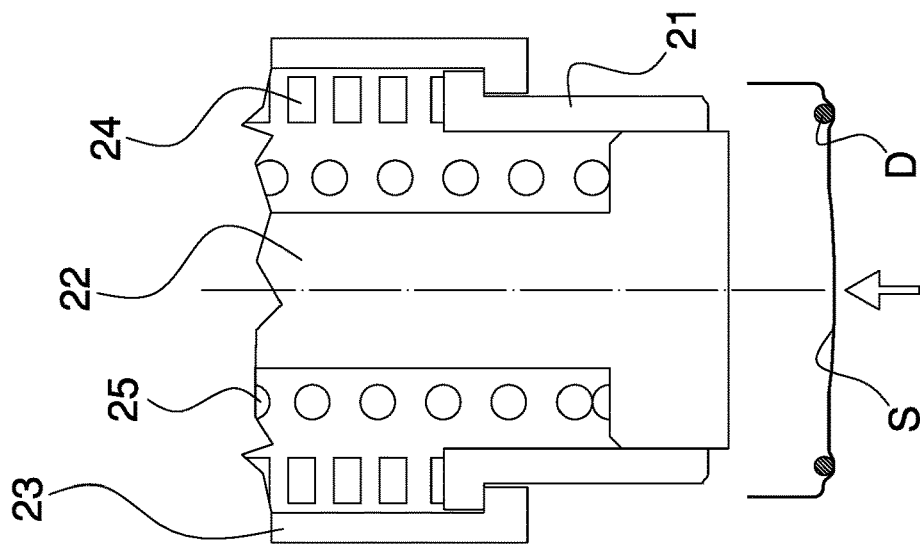

This compression-forming device (shown schematically in FIGS. 14 to 16) includes a punch having, for example, a first external annular punch 21 that presses the annular dose D and a second central punch 22 that presses against the surface S. The first and second punches 21 and 22 may be movable (axially slidable) in relation to one another. The first punch may further be movable (axially slidable) with respect to a peripheral tubular support 23. It is possible to provide a first elastic device 24 applied to the first punch and/or a second elastic device 25 applied to the second punch.

It is possible to provide for the compression-forming device with a third elastic device (not shown) applied to a support of the surface S for example a lower support that supports the capsule during moulding.

The compression-forming device includes an actuator for generating the compression-forming force. The actuator (for example a cam driving device similar to those disclosed previously or a fluid actuator, in particular a linear-action actuator) may be applied to the lower support that carries the surface S. The upper punch may be devoid of an actuator.

Figure 16:
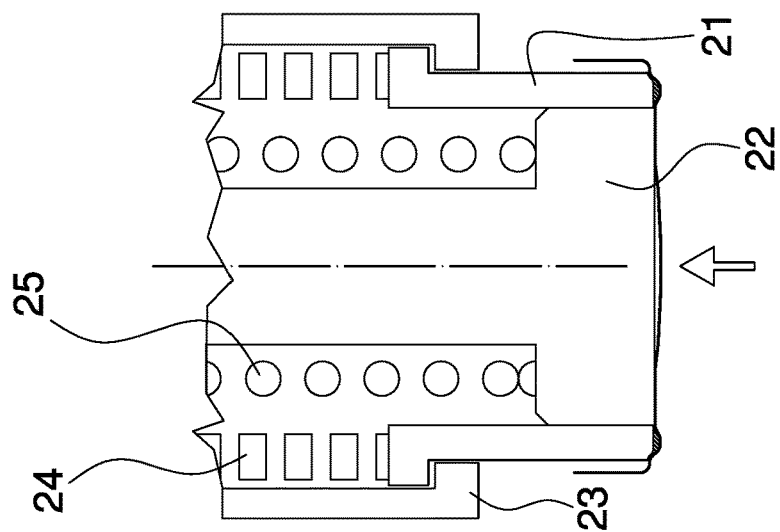
FIGS. 14 to 16 show three steps of compression-forming the annular dose to make a seal.

During the step of moulding the seal, the surface S is brought near lifted toward the upper punch by the actuator. In the specific case, first the central punch 22 will come into contact with the zone of the surface S that is inside the annular dose D (FIG. 15) to define and sealingly inwardly close a forming chamber of the seal. Then the annular punch 21 will compress the annular dose D to mould the seal as shown in FIG. 16.

It is also possible to provide embodiments including a valve 26 for adjusting the flow of the synthetic plasticised material and/or a thermal conditioner (for example one or more resistances 27) for heating one or more apparatus parts in contact with the synthetic plasticised material.

In use, a continuous flow (at a continuous flow rate) of plasticised material is supplied that is divided to go towards the various nozzles 7 of the rotating machine 1, passing through each annular extruder channel 8 up to the respective annular outlet 9. After this, continuing to supply the flow of material in a continuous manner, without in particular using check valves to prevent material return) an annular portion (of the desired volume) of the plasticised material is made to exit the annular outlet 9 in an open configuration in which the annular outlet 9 is in an open position. The material will leave the annular outlet (only) through the effect of the supply pressure of the plasticised material upstream of the annular channel 8, in particular through the pressure generated by the extruder 4 upstream of the carousel.

Subsequently, the annular outlet 9 is closed in such a manner that the annular portion that has left the nozzle 7 is separated from the rest of the plasticised material that remains inside the annular outlet 9.

Repeated opening and closing cycles of the annular outlet 9 are performed so as to form at each cycle at least one annular dose D. Each dose forming cycle is run at each revolution of the carousel 3.

The annular dose D that has left the annular channel 8 is separated from the rest of the material left inside the annular outlet 9 through the effect of the cut of the plasticised material made by the cutting edge of the tubular wall 11.

As has been seen, the annular dose D that has left the annular channel 8 is deposited on a surface S of a capsule for containers adhering to the aforesaid surface S. This capsule surface S is then removed, so the annular dose D is separated from the extruding nozzle 7 (in particular from the tubular wall 11 and/or from the core 10) by virtue of the fact that it adheres more to the capsule surface S than to the surfaces of the nozzle 7.

As has been seen, the annular dose D is then compression-formed directly on the (capsule) surface S on which it was previously deposited, in particular for forming a seal of the capsule.

The continuous flow of plasticised material through the main extruder conduit 5 may be constant. The frequency of the opening and closing cycles of each obturator 7 may also be constant.

The plasticised material may traverse the annular outlet 9 at a temperature below 250° C., in particular below 220° C. (and further, for example, above 150° C.) and/or at a pressure below 30 bar (and further, for example, above 20 bar). The average closing speed of the annular outlet 9 may be, in particular, lower than 1 m/sec (for example comprised between 0.1 and 1 m/sec, or between 0.5 m/sec and 1 m/sec).

The plasticised material may be selected, for example, from a group of materials that includes: polyethylene copolymers, such as, for example, LLDPE, LDPE, metocene; block styrene copolymers, for example two or three-block styrene copolymers, or branched copolymers, for example S-B-S, S-I-S, S-EB-S; polypropylene mixtures, for example EDPM, EDR; dynamic vulcanised polypropylene and EPDM products; dynamic vulcanised polypropylene and butyl rubber products; dynamic vulcanised polypropylene and natural rubber products; dynamic vulcanised polypropylene and nitrile rubber products.

The average exit speed of the plasticised material from the annular outlet 9 may be, for example, comprised between 5 and 100 mm/sec.

It is noted that the tubular wall 11 disclosed above defines a shearing ring having a relatively extremely thin cutting edge to enable clean and precise cutting of the material arranged at the annular outlet 9.

It is possible to obtain the same weight of annular doses D separated into the various opening and closing cycles (weight constancy), for example by the constancy of the total flowrate of the plasticised material conveyed by the extruder and the constancy of the shearing frequency (frequency of the opening and closing cycle of the annular outlet 9). The constancy of the flowrate of the plasticised material can be obtained by means of the control of the extruding screw (at a constant rotation rate) and/or by means of the use of a flowrate stabilising device (of known type).

It is further noted that it is possible to work the plasticised material at relatively low temperatures (and high viscosity).

The invention claimed is:

1. A method for applying a sealant to a surface of an object by an extruder having an annular channel communicating with an annular outlet, comprising the steps of:
   supplying a continuous flow of synthetic plasticised material through the annular channel as far as the annular outlet, said annular channel having a longitudinal axis, said annular outlet being configured so that an outlet direction of the synthetic plasticised material has at least one radial component that is normal to said longitudinal axis;
   continuing to supply said continuous flow, making an annular portion of the synthetic plasticised material exit the annular outlet, with the annular outlet in an open position, by pressurizing the synthetic plasticised material upstream of the annular channel;
   subsequently closing the annular outlet so that said exited annular portion is separated from the synthetic plasticised material that remains inside the annular outlet;
   performing opening and closing cycles of the annular outlet to form at each cycle at least one annular dose;
   separating the annular dose that has exited the annular channel from the rest of the material remaining inside the annular channel;
   depositing the annular dose that has exited the annular channel on the surface, wherein the annular dose that has just exited adheres to the surface and is then separated from plasticized material remaining in the annular channel; and
   compression forming the annular dose on the surface to form a seal, wherein in a closing position of said annular outlet,
   an annular plug surface of a tubular wall interacts with an annular plug seat of a core to close said annular outlet forming said annular dose with the synthetic plasticised material that has exited said annular outlet,
   said annular plug surface is in contact with said annular plug seat with a radial width of contact measured in a direction that is normal to said longitudinal axis and that is greater than zero and less than 0.2 mm,
   said tubular wall has an annular internal distal surface that is contiguous with said annular plug surface inside said annular channel and that is spaced away from said core, and
   at least a portion of said annular internal distal surface facing axially in a direction that is parallel to said longitudinal axis toward an internal surface of said core that is contiguous with said annular plug seat within said annular channel to define in said closing position an annular gap that is interposed between said internal distal surface and said internal surface within said annular channel.

2. A method according to claim 1, wherein said continuous flow of synthetic plasticised material through the annular channel comes from a constant flow extruder main conduit, the frequency of the opening and closing cycles of the annular outlet being constant.

3. A method according to claim 1, wherein said synthetic plasticised material traverses the annular outlet at a temperature below 250° C. and at a pressure below 30 bar.

4. A method according to claim 1, wherein said synthetic plasticised material traverses the annular outlet at a temperature above 150° C. and at a pressure above 20 bar.

5. A method according to claim 1, wherein the average closing speed of said annular outlet is below 1 m/sec.

6. A method according to claim 5, wherein the average closing speed of the annular outlet is between 0.1 and 1 m/sec.

7. A method according to claim 6, wherein the average closing speed of the annular outlet is between 0.5 m/sec and 1 m/sec.

8. A method according to claim 1, wherein said synthetic plasticised material is selected from a group of materials that includes polyethylene copolymers including at least one of, LLDPE, LDPE, and metocene; styrene block copolymers including at least one of S-B-S, S-I-S, and S-EB-S; polypropylene mixtures including at least one of EDPM and EDR; dynamic vulcanised products of polypropylene and EPDM; dynamic vulcanised products of polypropylene and butyl rubber; dynamic vulcanised products of polypropylene and natural rubber; and dynamic vulcanised products of polypropylene and nitrile rubber.

\* \* \* \* \*